(12) United States Patent
Everett et al.

(10) Patent No.: US 7,958,982 B2
(45) Date of Patent: Jun. 14, 2011

(54) CABLE GUIDE HAVING A SIGNALING INSTRUMENT

(75) Inventors: Bryan James Everett, Peoria, IL (US); Roger Dale Koch, Pekin, IL (US)

(73) Assignee: Caterpilar Inc., Peoria, IL (US)

( * ) Notice: Subject to any disclaimer, the term of this patent is extended or adjusted under 35 U.S.C. 154(b) by 419 days.

(21) Appl. No.: 12/149,234

(22) Filed: Apr. 29, 2008

(65) Prior Publication Data

US 2009/0266664 A1    Oct. 29, 2009

(51) Int. Cl.
*H02G 7/20*    (2006.01)
(52) U.S. Cl. ..................................... 191/12 R
(58) Field of Classification Search .............. 191/12 R, 191/12.2 R, 12.2 A, 12.4, 12 C, 40, 41; 37/104
See application file for complete search history.

(56) References Cited

U.S. PATENT DOCUMENTS

| | | | |
|---|---|---|---|
| 429,104 A | 5/1890 | Witthaus | |
| 2,471,312 A | 4/1948 | Corbliss | |
| 2,483,050 A | 9/1949 | Hinchon | |
| 3,533,483 A | 10/1970 | Ballinger | |
| 3,695,377 A | 10/1972 | Ito et al. | |
| 3,863,741 A | 2/1975 | Mitsuishi et al. | |
| 3,943,306 A | 3/1976 | Aihara et al. | |
| 4,071,124 A * | 1/1978 | Price | 191/12 R |
| 4,108,264 A | 8/1978 | Tanaka | |
| 4,119,908 A | 10/1978 | Cosman et al. | |
| 4,260,191 A | 4/1981 | Weber | |
| 4,423,852 A * | 1/1984 | Conroy et al. | 254/264 |
| 4,511,100 A | 4/1985 | Oetringhaus | |
| 4,587,383 A * | 5/1986 | Stoldt | 191/12 R |
| 4,862,088 A | 8/1989 | Etienne et al. | |
| 5,028,149 A | 7/1991 | Hardtke | |
| 5,170,352 A | 12/1992 | McTamaney et al. | |
| 5,299,130 A | 3/1994 | Ono | |
| 5,361,756 A | 11/1994 | Cernosek et al. | |
| 5,587,929 A | 12/1996 | League et al. | |
| 5,612,883 A | 3/1997 | Shaffer et al. | |
| 5,646,845 A | 7/1997 | Gudat et al. | |
| 5,740,994 A | 4/1998 | Laughlin | |
| 5,779,198 A | 7/1998 | Rutherford et al. | |
| 5,822,891 A | 10/1998 | Fujishima et al. | |
| 5,928,309 A | 7/1999 | Korver et al. | |
| 6,058,344 A | 5/2000 | Rowe et al. | |
| 6,064,926 A | 5/2000 | Sarangapani et al. | |
| 6,271,667 B1 | 8/2001 | Minarovic | |
| 6,336,051 B1 | 1/2002 | Pangels et al. | |
| 6,361,000 B1 | 3/2002 | Jette | |

(Continued)

OTHER PUBLICATIONS

U.S. Appl. No. 12/149,233, filed Apr. 29, 2008 (22 pages).

*Primary Examiner* — S. Joseph Morano
*Assistant Examiner* — R. J. McCarry, Jr.
(74) *Attorney, Agent, or Firm* — Finnegan, Henderson, Farabow, Garrett & Dunner LLP (57) ABSTRACT

A cable guide for a mobile machine is disclosed. The cable guide includes a supporting body, a guide member, and an electronic signaling instrument. The supporting body is configured to engage a worksite. The guide member is mounted on the supporting body and is configured to direct the cable in a fixed travel path in response to movement by the mobile machine. The electronic signaling instrument is engaged with the guide member and is configured to transmit an electronic signal indicative of a location of the cable guide.

20 Claims, 5 Drawing Sheets

U.S. PATENT DOCUMENTS

| | | |
|---|---|---|
| 6,363,632 B1 | 4/2002 | Stentz et al. |
| 6,557,943 B2 | 5/2003 | Ando |
| 6,595,464 B2 | 7/2003 | Peck |
| 6,612,516 B1 | 9/2003 | Haines |
| 6,678,394 B1 | 1/2004 | Nichani |
| 6,711,838 B2 * | 3/2004 | Staub et al. .............. 37/348 |
| 7,007,899 B1 | 3/2006 | Bachman |
| 7,009,399 B2 | 3/2006 | Olsson et al. |
| 7,010,425 B2 | 3/2006 | Gray et al. |
| 7,092,075 B2 | 8/2006 | Singh et al. |
| 7,181,370 B2 | 2/2007 | Furem et al. |
| 7,272,474 B1 | 9/2007 | Stentz et al. |
| 2004/0210370 A1 | 10/2004 | Gudat et al. |
| 2006/0085118 A1 | 4/2006 | Baldwin |
| 2006/0232427 A1 | 10/2006 | Minarovic |
| 2007/0150149 A1 | 6/2007 | Peterson et al. |

\* cited by examiner

CABLE GUIDE HAVING A SIGNALING INSTRUMENT

TECHNICAL FIELD

The present disclosure is directed to a cable guide, and more particularly, a cable guide having a signaling instrument.

BACKGROUND

Mobile machines such as, earthmoving machines, excavation-type machines, mining machines, and the like may be employed for mining or other earthmoving operations. These machines employ large earthmoving, excavating, or mining equipment, such as, electric mining shovels, configured to dig and load earthen material from a worksite, such as, an open-pit mine, to large off-road haulage units, such as, off-highway trucks which may be autonomously or semi-autonomously controlled. Typically, the shovel may be electrically powered and receive power from large, high-voltage cables tethered to the rear of the machine. The electric cables may lie across the ground of the worksite or along a bench floor during operation of the shovel. As the shovel moves to a new location, for example, when the shovel swings between a work surface and a mobile vehicle such as, an off-highway truck, that it is loading, the cables are dragged across the ground and their location changes relative to the ground.

Off-highway trucks may navigate to and from the shovel location to transport the earthen material from the worksite. An operator of the off-highway truck must avoid contact with the electric cables so as to prevent damage to both the electric cables and the truck. However, mobility and navigation around the electric cables may be difficult because the operator may be unable to see the ground, and thus locate the electric cables, near the truck.

One method of supporting electric cables for mining operations under such conditions is described in U.S. Pat. No. 4,587,383 (the '383 patent) to Stoldt, issued on May 6, 1986. The '383 patent describes a cable support system for a self-mobile, electrically powered machine provided with an electric cable for supplying power. The cable support system includes a rotatable turret, which may include a reel, on the machine and a portable cable tower spaced from the machine. The cable is suspended between the rotatable turret and the cable tower, wherein the cable extends from the cable tower to a remote power source. Constant cable tension is provided by the turret reel, or by a sheaving arrangement on the cable tower. The cable tower is also provided with a slot whereby the machine is used to move the tower to different locations while still being supplied with electricity therefrom.

Although the cable support system of the '383 patent may provide support to electrical cables under mining conditions, it may have limitations. For example, costly modifications must be made to existing machines to support the rotatable turret mounted on top of the machine.

The cable guide of the present disclosure is directed towards improvements to the existing technology.

SUMMARY OF THE DISCLOSURE

One aspect of the present disclosure is directed to a cable guide configured to guide a cable of a mobile machine along a worksite during operation. The cable guide may include a supporting body configured to engage the worksite and a guide member mounted on the supporting body. The guide member may be configured to direct the cable in a fixed travel path in response to movement by the mobile machine. An electronic signaling instrument may be engaged with the guide member and configured to transmit an electronic signal indicative of a location of the cable guide.

Another aspect of the present disclosure is directed to a method for avoiding a cable tethered from a mobile machine along a worksite via a cable guide, the cable guide including a supporting body, a guide member mounted on the supporting body, and an electronic signaling instrument associated with the guide member. The method may include engaging the supporting body with the worksite surface and engaging the cable with the guide member. The method may also include directing the cable in a fixed travel path in response to movement by the mobile machine and transmitting an electronic signal based on a location of the cable guide.

DETAILED DESCRIPTION

Figure 1:
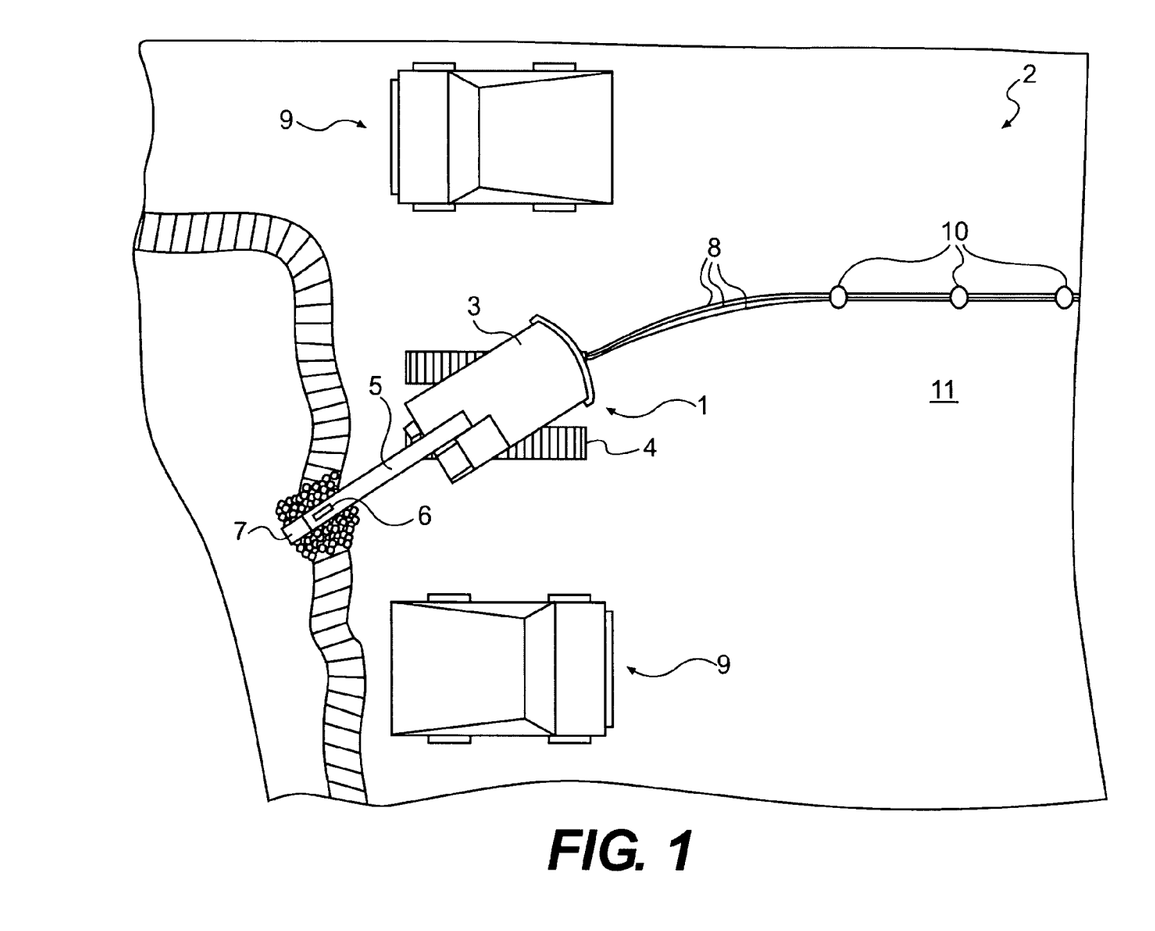
FIG. 1 is a diagrammatic illustration of a mobile machine operating at a worksite according to an exemplary disclosed embodiment.

A diagrammatic illustration of a mobile machine 1 operating at a worksite 2 is shown in FIG. 1. Machine 1 may be any type of machine capable of excavating earth, such as, an excavator, an electric mining shovel, or the like. Machine 1 may be self-propelled and include a rotatable car body 3 connected to an undercarriage 4. Machine 1 may also include a boom 5, a stick 6, and an earthmoving tool 7. The boom 5 may be pivotally mounted on machine 1 by a boom pivot pin. Stick 6 may be pivotally connected to the free end of boom 5 at a stick pivot pin. Earthmoving tool 7 may be a power shovel, a bucket, or the like, and may be pivotally attached to stick 6 at a bucket pivot pin and configured to dig, scoop, and load material, such as ore, coal, or other minerals. A cable 8, e.g., a set of high voltage cables, may be engaged with and tethered from one or more large electric motors (not shown) on the rear of machine 1. Cable 8 may be configured to provide electricity from a central power source (not shown) to machine 1 so as to power the operation of machine 1 and earthmoving tool 7. Machine 1 may be configured to travel along worksite 2, such as, for example, an open-pit mine. Car body 3 may rotate so that earthmoving tool 7 may excavate and load material from various locations of worksite 2 along the path of rotation. Earthmoving tool 7 may be configured to unload material to worksite equipment, such as vehicle 9, wherein vehicle 9 may transport material from worksite 2.

A plurality of cable guides 10 may be engaged with the worksite surface 11 and configured to guide cable 8 along the worksite surface 11 during operation of machine 1. During operation, machine 1 may have the ability to reverse, go forward, rotate 360 degrees, and in general, maneuver freely. As machine 1, in particular car body 3, rotates to alternate loading of material and unloading into vehicle 9, or maneuvers along worksite 2, constant tension may be provided to cable 8 via a cable storage spool (not shown). Cable guides 10 may direct cable 8 along a fixed, straight lined path between adjacent cable guides 10. Furthermore, cable guides 10 may be sensed and identified by an operator of vehicle 9 or any worksite vehicle. This may allow the operator to determine a travel path which avoids contact with cable 8. As shown in the exemplary embodiment of FIG. 1, vehicle 9 may be a mining truck. It should be appreciated that vehicle 9 may be, for example, a dozer, a motor grader, wheel loader, or any other type worksite equipment used to perform a variety of tasks.

Figure 2:
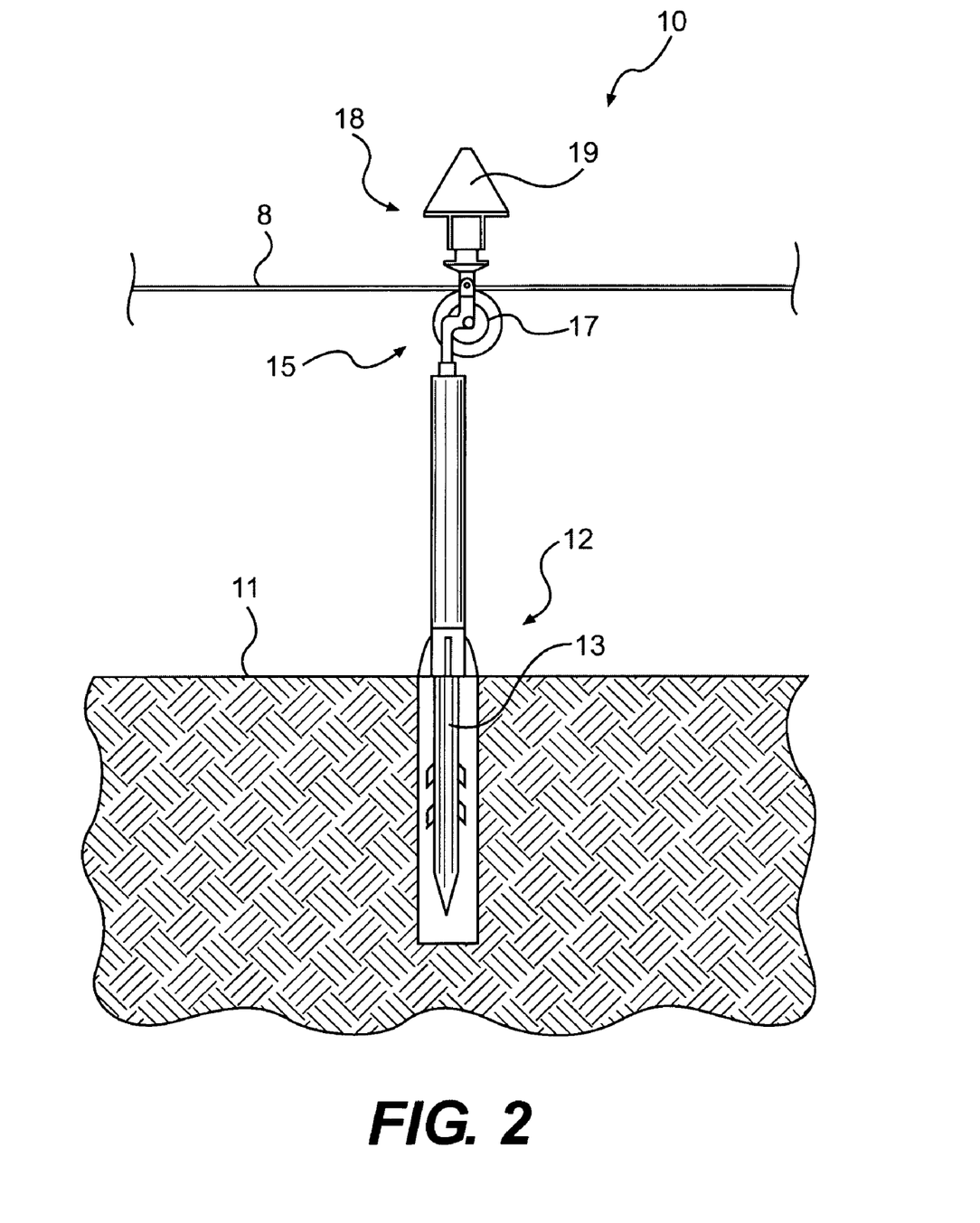
FIG. 2 is a diagrammatic illustration of a cable guide for a mobile machine according to an exemplary disclosed embodiment.

As shown in FIG. 2, cable guide 10 may include a supporting body 12 engaging worksite surface 11. In this particular embodiment, supporting body 12 may include an elongated member, such as stake 13, imbedded into worksite surface 11. Stake 13 may elevate cable guide 10 from surface 11 and may also be configured to fix and stabilize cable guide 10 against tension and movement from cable 8. In an alternative embodiment shown in FIG. 3, supporting body 12 may include a base 14 mounted on top of surface 11. The base may have sufficient counterweight to counteract tension and movement of cable 8 and support cable guide 10 during operation of machine 1.

Figure 3:
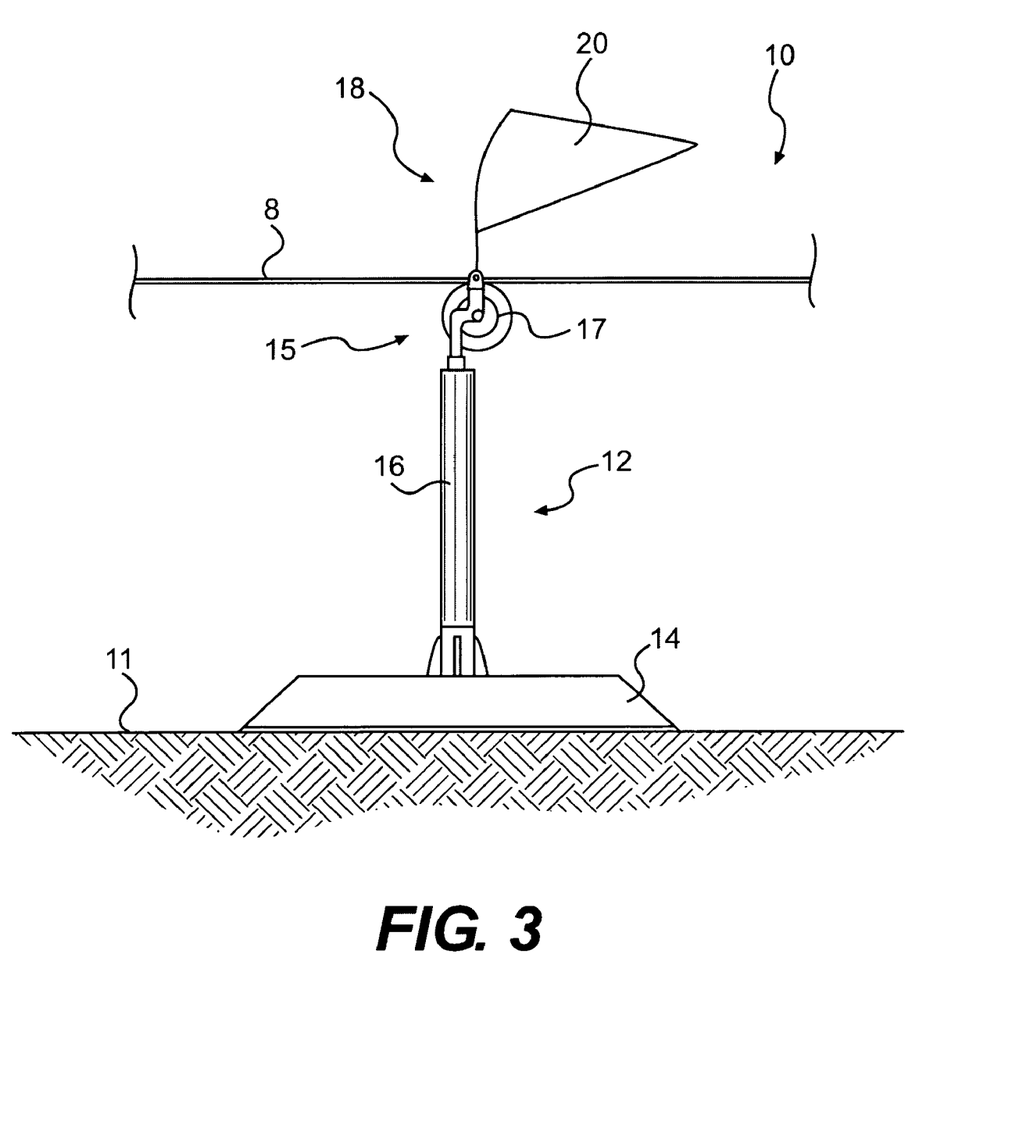
FIG. 3 is a diagrammatic illustration of another embodiment of a cable guide for a mobile machine according to an exemplary disclosed embodiment.
Figure 4:
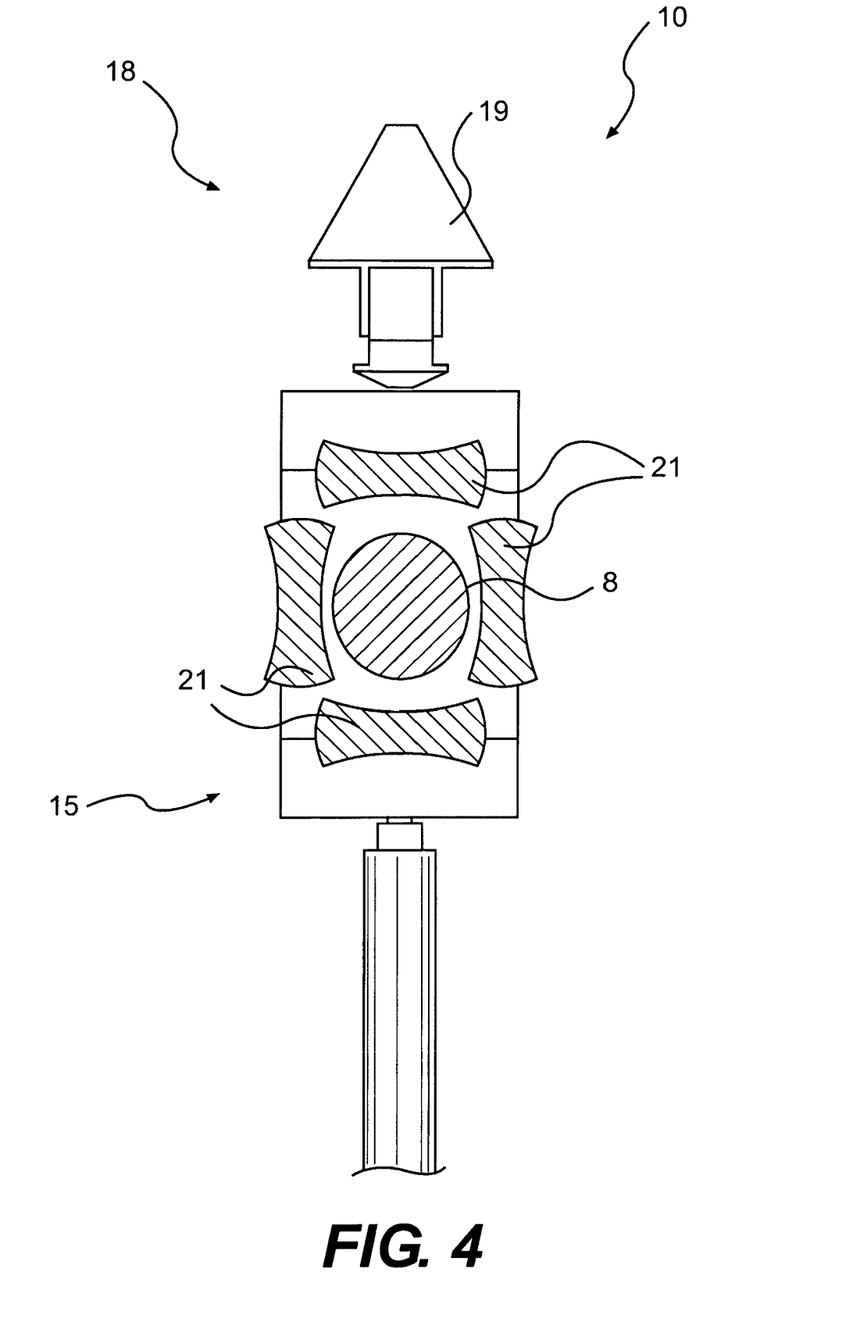
FIG. 4 is a cross-sectional illustration of an embodiment of a guide member for a cable guide according to an exemplary disclosed embodiment.

A guide member 15 may be mounted on supporting body 12 and configured to direct cable 8 in a fixed travel path in response to movement by the earthmoving tool 7. As shown in FIG. 3, guide member 15 may be engaged with base 14 via a pole 16. Alternatively, cable guide 10 may be directly mounted onto base 14. Cable 8 may be engaged with guide member 15, wherein the guide member 15 supports and elevates cable 8 a desired distance above surface 11. In the embodiments of FIG. 2 and FIG. 3, guide member 15 may include at least one pulley 17, wherein cable 8 may be draped along pulley 17. Guide member 15 may be pivotally engaged with supporting body 12 so as to accommodate lateral movement of cable 8. As shown in FIG. 4, guide member 15 may also include multiple rotating rollers 21 positioned around the cable 8 so as to guide and support cable 8 not traveling in a straight path, thereby, supporting lateral and vertical loads of cable 8.

Figure 5:
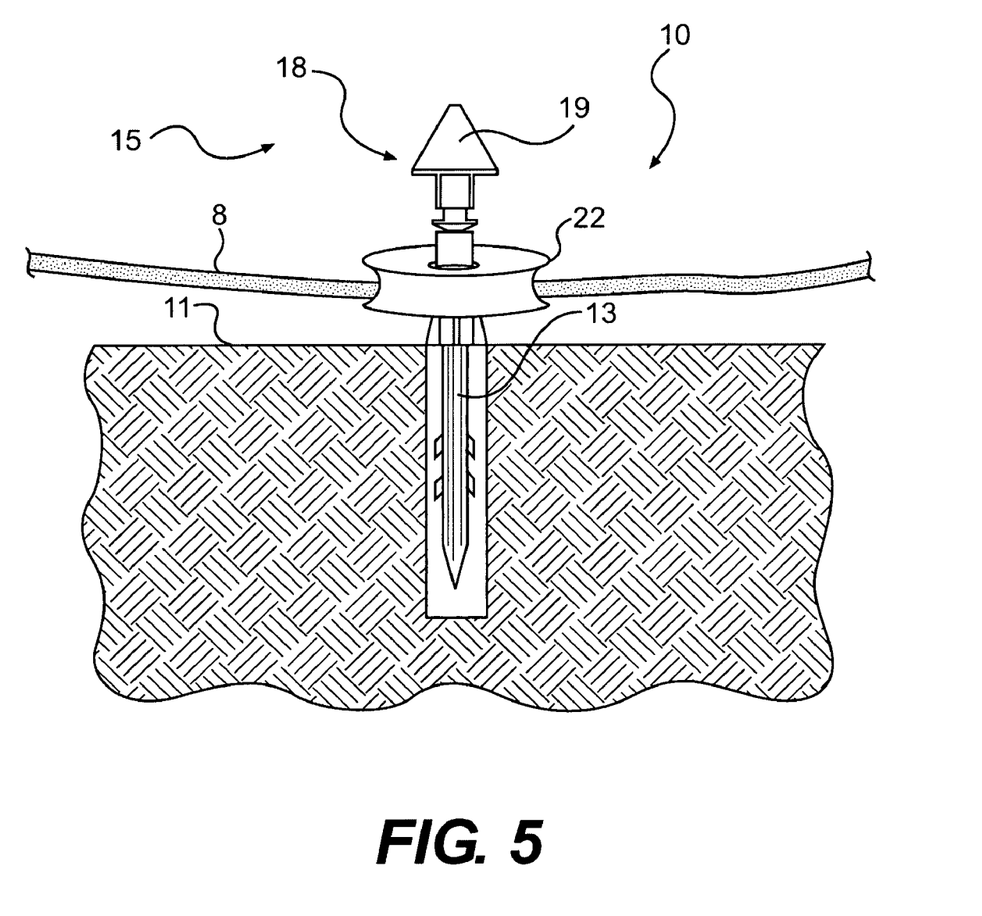
FIG. 5 is diagrammatic illustration of another embodiment of a cable guide for a mobile machine according to an exemplary disclosed embodiment.

Although one pulley 17 is illustrated in FIG. 2 and FIG. 3, it will be understood that the number of pulleys could be one or more than one and still fall within the scope of this disclosure. For example, cable 8 may be threaded between multiple opposing pulleys. Furthermore, expedients other than pulleys, such as rotatable spools 22, as shown in FIG. 5, retractable wheels, roller bearings, or the like, may be employed. Any type of guide member configured to support cable 8 along worksite surface 11 and direct cable 8 along a fixed path may be employed.

A signaling instrument 18 may be mounted on guide member 15 and configured to transmit a signal based on a location of cable guide 10. As shown in FIG. 2, signaling instrument 18 may include an electronic marker 19 configured to transmit the signal electronically. Electronic marker 19 may be, for example, a passive transponder configured to radiate an electromagnetic field. An appropriate receiver, such as a conventional transceiver, may be employed to detect and locate the transponder, and thus, the location of cable guide 10. In particular, worksite equipment, such as vehicle 9, traveling within worksite 2 may employ the receiver and sense the electronic signal transmitted from electronic marker 19. As vehicle 9 approaches cable guide 10, the electronic signal may be converted to a warning signal by an appropriate controller (not shown) associated with vehicle 9. The warning signal may become active when the receiver and the electronic marker 19 are within a predetermined distance stored within a memory of the controller. The strength of the electronic signal transmitted by electronic marker 19 may increase and be sensed by the receiver as vehicle 9 approaches cable guide 10. Once the electronic signal reaches a predetermined strength, corresponding to the predetermined distance, the controller may activate the warning signal.

The warning signal may be an auditory or visual signal, such as an alarm or a flashing light, configured to alert an operator of vehicle 9. The operator may responsively maneuver vehicle 9 to avoid a traveling path proximal to cable guide 9. In an exemplary embodiment shown in FIG. 1, vehicles 9 may travel in paths parallel to cable guides 10 and in distances safely away from cable guides 10 so as to avoid cable guides 10 and thus contact with cables 8. The predetermined distance, in which the warning signal may be responsive to, may be a distance indicating that vehicle 9 is within the vicinity of cable guide 10. Furthermore, the predetermined distance may be selected to provide adequate space between cable guide 10 and vehicle 9 so that vehicle 9 may maneuver in response to the warning signal without coming into contact with cable guide 10 and thus cable 8. As vehicle 9 travels distally from cable guide 10, the warning signal may diminish indicating that vehicle 9 is outside of the predetermined distance from cable guide 10 and traveling in a location of worksite 2 safely away from potential contact with cable guides 10 or cables 8. The diminishing warning signal may be, for example, a gradual decrease in volume of an auditory signal, or a gradual decrease in the rate of a flashing light.

Alternatively, vehicle 9 may be an autonomous vehicle. As described above, the electronic signal delivered to autonomous vehicle 9 may be converted to a warning signal. An appropriate control system of autonomous vehicle 9 may responsively react to the warning signal and determine a travel path along worksite 2 to avoid the vicinity of cable guides 10 and thus cables 8.

It should be appreciated that a variety of known types of electronic markers and receivers may be capable of transmitting and detecting a signal based on the location of cable guide 10 and that the particular type of electronic marker that may be employed is beyond the scope of this disclosure. For example, signaling instrument 18 may include a global positioning system (GPS) receiver configured to determine the GPS coordinates of cable guide 10. The coordinates are recorded and the location of the cable guide 10 determined relative to worksite 2. Additionally, scanning lasers, radar, motion sensors, and the like may also be employed to determine the location of and proximal distance to cable guide 10.

Alternatively, as shown in FIG. 3, signaling instrument 18 may include a visual marker 20. Visual marker 20 may be configured to provide visual recognition of a location of cable guide 10. Visual marker 20 may be an apparatus having sufficient size and visual stimulation which may be readily detected from considerable distances within worksite 2. A variety of visual markers, for example, brightly colored flags, ribbons, reflectors, flashing lights, brightly colored filaments, stakes, colored paint, and the like may be employed to provide visual indication of cable guide 10, and the particular type of visual marker that may be employed is beyond the scope of this disclosure. Although not shown in the exemplary embodiments of FIG. 2 and FIG. 3, signaling instrument 18 may include a combination of visual marker 20 and electronic marker 19 to provide an enhanced indication of cable guide 10 location.

Alternatively, cable 8 may be free of tension from cable spool (not shown), and a series of smaller electronic markers 19 may be engaged with cable 8 at fixed intervals. In response to movement by machine 1, electronic markers 19 engaged with cable 8 may move with cable 8 onto cable guide 9. Electronic markers 19 may then transmit a signal based on a location of cable 8, thereby, eliminating the need to reposition cable guides 10 around worksite 2.

Although the exemplary embodiments of the present disclosure have been described in terms of a guide for electric cables for mobile machines, it should be appreciated that the disclosed guide is not restricted to electric cables for mobile machines and may also be employed in other applications that use long runs of cable, rope, or piping that may not be considered permanent infrastructure.

INDUSTRIAL APPLICABILITY

The disclosed cable guide 10 may have applicability with electrical power cables 8 for a mobile machine 1. For example, and as shown in FIG. 1, cable guides 10 may serve to support and guide cables 8 along worksite surface 11 via a fixed travel path. The disclosed vehicles 9, cable guides 10, electric cables 8, and mobile machine 1 may provide a mobile machine system that enables haulage units, such as off-highway trucks, to avoid contact with electric cables so as to prevent damage to the electric cables and to the haulage units.

During operation of machine 1, a plurality of cable guides 10 may be engaged with worksite surface 11 at various locations so as to not interfere with operation of machine 1 or other equipment, such as, vehicle 9, operating in the vicinity of machine 1. Cable 8 may be engaged and supported by guide member 15 of cable guide 10 (shown in FIG. 2 and FIG. 3). At one end, cable 8 may be tethered from one or more large electric motors (not shown) on the rear of machine 1 and may provide electrical energy to machine 1 to power earthmoving tool 7. At an opposite end, a cable storage spool (not shown) may provide constant tension to cable 8, lifting cable 8 above work surface 11 as excess cable 8 is reeled in or payed out automatically in response to movements by machine 1. As machine 1 travels and alternates between locations within worksite 2, guide members 15 of cable guide 10 may maintain cable 8 within a fixed travel path between each cable guide 10 and above worksite surface 11.

Signaling instruments 18 (shown in FIG. 2 and FIG. 3) mounted on guide members 15 may transmit a signal based on a location of cable guide 10. Signaling instrument 18 may include electronic marker 19, such as a transducer, and/or visual marker 20, such as a brightly colored flag. An operator of worksite equipment, such as vehicle 9, may determine the location of each cable guide 10 by electronically detecting the location of electronic marker 19 via an appropriate receiver and/or visually identifying visual marker 20. As vehicle 9 approaches cable guide 10, an electronic signal delivered from electronic marker 19 of cable guide 10 may be detected by the receiver and converted to a warning signal by an appropriate controller (not shown) associated with vehicle 9. The warning signal may become active when the receiver and the electronic marker 19 are within a predetermined distance. The warning signal may alert an operator of vehicle 9 that vehicle 9 is traveling within the vicinity of cable guides 10.

Because cable 8 is maintained within a fixed travel path between adjacent cable guides 10, the operator may accurately predict the location of cable 8 based on the warning signals indicative of a proximal location of each cable guide 10. The operator may then maneuver vehicle 9 through areas of worksite 2 which are clear of cable 8, thereby, avoiding contact with cable 8 and potential damage to cable 8, vehicle 9, and/or machine 1.

Employing cable guide 10 to support power cable 8 for machine 1 may be a cost-effective method to support and guide cable 8 along worksite 2. Cable guides 10 may be positioned in various locations of worksite 2, and cable 8 from existing machines 1 may engage guide members 15. Assembly of extra components and apparatus onto machine 1 is not required. Furthermore, the signaling instrument 18 may effectively determine the location of cable guides 10 and thus cable 8. Large and costly structures are not required to support cable 8 high above worksite surface 11 so that operators of other worksite equipment, such as vehicle 9, can maneuver without coming into contact with cable 8. In contrast, cable 8 may be located via signaling instruments 18 mounted on the more compact, transportable, and cost-effective cable guides 10, and avoided by the operators.

It will be apparent to those skilled in the art that various modifications and variations can be made to the cable guide of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A method for avoiding a cable tethered from a mobile machine along a worksite via a plurality of cable guides, each cable guide including a supporting body, a guide member mounted on the supporting body, and an electronic signaling instrument associated with the guide member, the method comprising:
   fixedly entrenching each supporting body in the worksite;
   engaging the cable with the respective guide members;
   directing the cable along a fixed travel path in the worksite with the cable guides and above a surface of the worksite between the cable guides in response to movement by the mobile machine; and
   transmitting an electronic signal based on a location of at least one of the cable guides.

2. The method of claim 1, further including sensing the electronic signal by at least one vehicle located within the worksite.

3. The method of claim 2, further including converting the electronic signal to a warning signal as the at least one vehicle approaches the at least one cable guide.

4. The method of claim 3, further including activating the warning signal to avoid a traveling path of the at least one vehicle proximal to the at least one cable guide.

5. The method of claim 3, further including diminishing the warning signal as the at least one vehicle travels distally from the at least one cable guide.

6. The method of claim 1, wherein directing the cable along the fixed travel path further includes providing tension to the cable along the respective guide members.

7. The method of claim 1, further including:
   determining based on the electronic signal if the at least one vehicle is within a predetermined distance from any of the cable guides; and
   producing a warning signal in the vehicle when the at least one vehicle is within the predetermined distance from any of the cable guides.

8. A mobile machine system, comprising:
   a set of cables engaged with and tethered from a mobile machine;
   a plurality of cable guides configured to guide the set of cables along a fixed travel path in a worksite and above a surface of the worksite between the cable guides during operation of the mobile machine, each cable guide comprising:

a supporting body fixedly entrenched in the worksite;

a guide member mounted on the supporting body, the guide member configured to direct the cable along the fixed travel path in response to movement by the mobile machine; and an electronic signaling instrument connected to the guide member and configured to transmit an electronic signal based on a location of the cable guide; and at least one vehicle configured to travel in and out of the worksite.

9. The mobile machine system of claim 8, wherein the mobile machine is an electric mining shovel and the set of cables is configured to deliver electric power to the shovel.

10. The mobile machine system of claim 8, wherein the electronic signal is sensed by the at least one vehicle within the worksite.

11. The mobile machine system of claim 10, wherein the electronic signal is converted to a warning signal as the at least one vehicle approaches at least one of the cable guides.

12. The mobile machine system of claim 11, wherein the warning signal is activated to avoid a traveling path of the at least one vehicle proximal to the at least one cable guide.

13. The mobile machine system of claim 11, wherein the warning signal diminishes as the at least one vehicle travels distally from the at least one cable guide.

14. The mobile machine system of claim 8, wherein the guide member includes at least one pulley rotatably mounted on top of the supporting body.

15. A cable guidance system, comprising:

a set of cables engaged with and tethered from a mobile machine; and a plurality of cable guides configured to guide the set of cables along a fixed travel path in a worksite and above a surface of the worksite between the cable guides during operation of the mobile machine, each cable guide comprising:

a supporting body fixedly entrenched in the worksite, a guide member mounted on the supporting body, the guide member configured to direct the cable along the fixed travel path in response to movement by the mobile machine, and an electronic signaling instrument connected to the guide member and configured to transmit an electronic signal that is detectable to determine a location of the cable guide.

16. The cable guidance system of claim 15, wherein the mobile machine is an electric mining shovel and the set of cables is configured to deliver electric power to the shovel.

17. The cable guidance system of claim 15, wherein the electronic signal is sensed by at least one vehicle configured to travel in and out of the worksite.

18. The cable guidance system of claim 15, wherein each supporting body is configured to be inserted into the ground to be fixedly entrenched in the worksite.

19. The cable guidance system of claim 15, wherein the electronic signal is detectable by at least one vehicle configured to travel in and out of the worksite and configured to produce a warning signal in response to the electronic signal when the at least one vehicle is within a predetermined distance from any of the cable guides.

20. The mobile machine system of claim 8, wherein the at least one vehicle is configured to receive the electronic signal and produce a warning signal in response to the electronic signal when the at least one vehicle is within a predetermined distance from any of the cable guides.

* * * * *